United States Patent [19]

McLean

[11] Patent Number: 4,658,534

[45] Date of Patent: Apr. 21, 1987

[54] FISHING POLE HOLDER DEVICE

[76] Inventor: Howard McLean, 520 E. Babcock, Bozeman, Mont. 59715

[21] Appl. No.: 887,791

[22] Filed: Jul. 21, 1986

[51] Int. Cl.⁴ ............................................. A01K 97/10
[52] U.S. Cl. ...................................... 43/21.2; 248/532
[58] Field of Search .................. 43/21.2; 248/530, 532, 248/545, 156

[56] References Cited

U.S. PATENT DOCUMENTS

| 1,577,612 | 3/1926 | Dees | 43/21.2 |
| 3,898,756 | 8/1975 | Tolle | 43/21.2 |
| 3,903,633 | 9/1975 | Hutcherson | 43/21.2 |
| 3,924,345 | 12/1975 | Sapp | 43/21.2 |
| 4,131,122 | 12/1978 | Brooks | 248/532 |

FOREIGN PATENT DOCUMENTS

| 262586 | 10/1949 | Switzerland | 248/156 |
| 15521 | of 1908 | United Kingdom | 248/532 |

Primary Examiner—Gene P. Crosby
Attorney, Agent, or Firm—Richard C. Conover

[57] ABSTRACT

A fishing rod or pole holder having a hollow pipe member for holding the fishing pole. The holder having a threaded bore at one end thereof for threadably mounting the holder to a spike. The spike having a pointed end for driving into ice or ground and a head end. A threaded collar is secured to the spike adjacent the head end but spaced therefrom so that when the head is hit with a hammer or a rock, for example, the threads on the collar are not damaged. The threaded collar further being adapted to be received by the threaded bore in the holder when the spike is positioned either with the pointed end through the pipe, as would be the case when the holder is being carried and is not being used to hold a fishing pole, and also with the pointed end outside the pipe, as would be the case when the spike is to be used to hold a fishing pole.

1 Claim, 4 Drawing Figures

FISHING POLE HOLDER DEVICE

BACKGROUND OF INVENTION

The present invention relates to a device for holding a fishing pole. The device has particular application for holding a fishing pole in sand, in ice or on a boat. There are several types of fishing pole holders now known, such as U.S Pat. No. 1,577,612 to Dees. This patent describes a portable fishing pole support wherein a threaded spike rod is threaded into a hollow cylinder for supporting a fishing pole. When the spike is not being used, the spike is unthreaded from the cylindrical holder and the spike element positioned inside the holder.

U.S. Pat. No. 4,150,506 describes a fishing rod holder which includes a spike for insertion into the ground. A platform for driving the spike into the ground is affixed to the spike and a hollow open-ended cylinder is pivotally affixed to the platform such that the open-ended cylinder may be pivoted away from the platform so that the spike can be driven into the ground. There are several other known fishing pole holders which include sand spikes such as shown in U.S. Pat. No. 2,414,358 and also fishing rod holders in which the spike element can be positioned within the cylindrical fishing pole holder when not in use, such as shown in U.S. Pat. No. 3,021,101.

SUMMARY OF THE INVENTION

The present invention is an improvement over those fishing pole holders now known in the art. The present invention includes a spike to which is secured a threaded male connector formed on a collar secured to the spike. This collar is secured to the spike adjacent the head end of the spike but spaced therefrom. The spike is constructed of material resistant to pounding such as a heavy duty nail so that it can be driven into ice, for example, with a hammer. Once the spike is driven into the ground or ice, a pipe element having an internal threaded bore at one end thereof is threaded onto the threaded male connector of the spike. A fishing pole handle can then be placed in the pipe element.

There are several advantages of this particular device. Once the device is collapsed, the spike element can be turned around and again threaded into the pipe so that the point is barely extending beyond the other open end of the pipe. The second advantage is that the spike is removable from the pipe element so that it can be driven into the ground separately from the pipe element. This has been a problem with previous fishing pole holders because when the pipe was hit with a hammer or rock or other device, for example, the pipe element tended to break or become deformed when struck.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
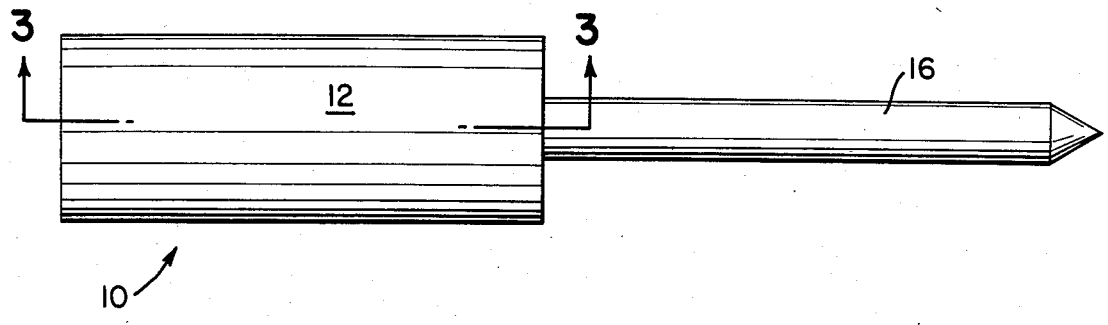
FIG. 1 is a perspective view of the complete fishing pole holder in its assembled condition in accordance with the present invention.
Figure 2:
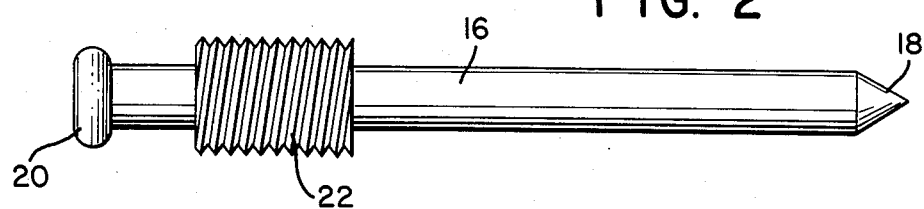
FIG. 2 is a top view of the spike element of the present invention.
Figure 3:
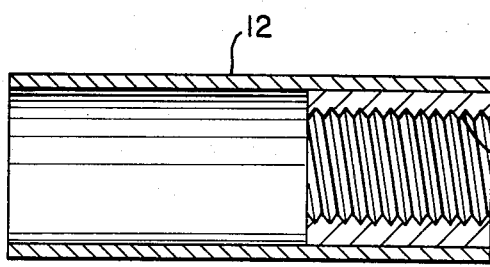
FIG. 3 is a cross-sectional view along line 3—3 in FIG. 1 of the pole holder with the spike element removed.

The fishing pole holder 10 according to the present invention is shown in FIG. 1. This fishing pole holder 10 includes a cylindrical and hollow pipe member 12 having a threaded internal bore 14 at one end thereof and being open-ended at the other end thereof. Further, the fishing pole holder 10 includes a spike element 16 as shown in FIG. 2 having a pointed end thereof at 18 and a head portion 20 located at the end opposite the pointed end 18. In a preferred embodiment, the spike element 16 is constructed of a sturdy material so that when the head 20 is hit with a hammer or mallet or rock, the spike can be driven into hard ground or ice. On the spike 16 is formed a threaded collar 22 which is secured to the spike 16 adjacent the head 20 but spaced therefrom. This threaded collar 22 is sized to be threadably received by the threaded bore 14 of the cylindrical pipe element 12.

In order to use this device, for example with ice, the spike element 16 is driven into the ice with a hammer, the hammer being driven onto the head 20 for driving the spike 16 into the ice. Since the head 20 is separated from the threaded collar 22, the threaded collar is not damaged by hitting the head 20. Once the spike 16 is driven into the ice, then the pipe 12 is threaded onto the threaded collar 22, the threaded collar 22 being received by threaded bore 14. In this completely assembled condition, the pipe 12 can receive the handle of the fishing pole.

When it is desired to transport the fishing pole holder 10, the threaded pipe 12 is removed from the threaded spike 16 and the spike 16 removed from the ground or ice. The spike element 16 is then turned end for end and the pointed end 18 of the spike inserted inside the pipe 12 and the threaded collar 22 again threadably received by the threaded bore 14. In this condition, the spike is held within the pipe 12 with only a small portion of the pointed end 18 extending beyond the pipe 12. Thus, this fishing pole holder is easily transportable and can be placed in a fishing tackle box, for example. When this is done, it will not interfere with other devices the user may be carrying.

While all of the fundamental features of the invention have been shown and described, it should be understood that various substitutions, modifications and variations may be made by those skilled in the art without departing from the spirit or scope of the invention. Accordingly, all such modifications and variations are included within the scope of the invention as defined by the following claim.

I claim:

1. An improved holder for fishing rods comprising:
   (a) A hollow elongated support member having an open end and having a closed second end with a threaded bore therethrough;
   (b) A spike having a pointed end and a head end opposite the pointed end, and further having a threaded collar secured to the spike at a position adjacent the head but spaced therefrom; and
   (c) The threaded collar being sized and shaped to be threadably received by the threaded bore when the spike is oriented in a direction with the pointed end through the threaded bore and through the support member or in a direction opposite thereto.

* * * * *

UNITED STATES PATENT AND TRADEMARK OFFICE
CERTIFICATE OF CORRECTION

PATENT NO. : 4,658,534

DATED : April 21, 1987

INVENTOR(S) : Howard McLean

Figure 4:
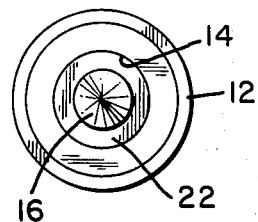
FIG. 4 is a cross-sectional view taken between the head and collar of the spike element with the spike element in the pipe member.

It is certified that error appears in the above—identified patent and that said Letters Patent is hereby corrected as shown below:

Column 2, Lines 1-3 should be deleted and the following inserted:

"Fig. 4 is a right hand side view of the pole holder shown in Fig. 1."

Signed and Sealed this

Eighth Day of March, 1988

*Attest:*

DONALD J. QUIGG

*Attesting Officer*      *Commissioner of Patents and Trademarks*